United States Patent Office 3,314,949
Patented Apr. 18, 1967

3,314,949
2-SUBSTITUTED AMINO-2H-1,2,4-BENZO-
THIADIAZINE 1,1-DIOXIDES
Peter H. L. Wei, Upper Darby, and Stanley C. Bell, Philadelphia, Pa., assignors to American Home Products Corporation, New York, N.Y., a corporation of Delaware
No Drawing. Filed Feb. 14, 1964, Ser. No. 344,820
7 Claims. (Cl. 260—243)

This invention relates to compositions of matter classified in the art of chemistry as substituted benzothiadiazines.

The invention sought to be patented in its principal composition aspect resides in the concept of a composition of matter being a chemical compound having a molecular structure in which there is attached to the 2-position of the 2H-1,2,4-benzothiadiazine 1,1-dioxide nucleus an acetamido group or its hereinafter disclosed equivalents.

The tangible embodiments of the principal composition aspect of the invention possess the inherent general physical properties of being relatively high melting crystalline solids; are substantially insoluble in water and are soluble in polar solvents, such as lower aliphatic alcohols. Examination of the compounds produced according to the hereinafter described process reveals, upon spectrographic analysis, spectral data confirming the molecular structure hereinbefore set forth. The aforementioned physical characteristics taken together with the nature of the starting materials and the mode of synthesis positively confirm the structure of the compositions sought to be patented.

The tangible embodiments of the principal composition aspect of the invention possess the inherent applied use characteristic of exerting qualitatively varying therapeutic effects, as evidenced by pharmacological evaluation according to standard procedures. These tangible embodiments show anti-Parkinsonian, hypotensive, and muscle-relaxant effects.

The manner and process of making the invention will now be generally described so as to enable a person skilled in the art of chemistry to make the same.

The new process of the invention is illustrated schematically for a specific embodiment thereof in Scheme A, below, and more generally in Scheme B, to which the numerals in parenthesis in the following description refer.

SCHEME A

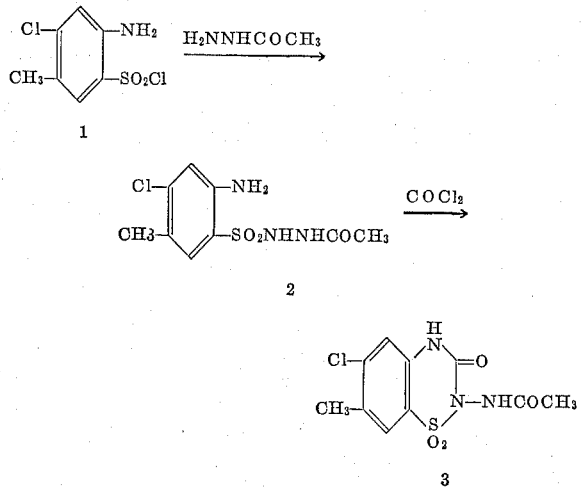

SCHEME B

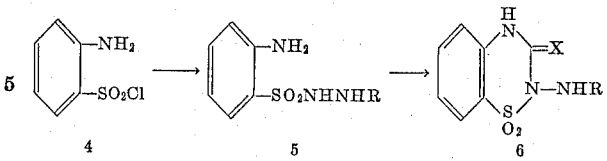

The starting 2-(2-amino-4-chloro-5-methylphenylsulfonyl)-1-acetylhydrazide (2) (5) can be prepared according to the following general procedure which involves treating a 2-amino-4-chloro-5-methylphenylsulfonyl chloride (1) (4) with a mixture of acetylhydrazide and triethylamine in alcohol.

According to one procedure, the physical embodiments of our concept are made by reacting an above-described 2-(2-amino-4-chloro-5-methylphenylsulfonyl) - 1 - acetylhydrazide with phosgene thereby forming a 2-acetamido-2H-1,2,4-benzothiadiazin-3(4H)-one 1,1-dioxide (3) (6). The reaction is usually carried out in an inert solvent such as 1,2-dimethoxyethane and at the reflux temperature of the reaction mass for a time sufficient to complete the reaction. The proportion of the reactants may be in equimolar quantities, but, preferably, a slight excess of phosgene is used.

The substituted 2-aminophenylsulfonyl halides (i.e., chlorides, bromides, and fluorides) and the hydrazides used in the above-described process are generally known or are readily prepared by procedures known to those skilled in the art.

It will be apparent from the disclosure herein to those skilled in the art of organic chemistry that for the purposes of this invention, certain of the carbon atoms of the 2-aminophenylsulfonyl chlorides, bromides and fluorides employed as starting materials can be substituted with non-interfering groups. Therefore, in the process of the invention, all 2-aminophenylsulfonyl chlorides, bromides and fluorides can be employed in the process of making aspect of this invention to form compounds which are the full equivalents of the invention as particularly claimed. For example, but without limitation, either the 3-, 4-, or the 5-position of the 2-aminophenylsulfonyl starting compound can be substituted with an alkyl group such as methyl, ethyl, propyl, isopropyl and hexyl, a halogen atom such as a chlorine, or a bromine atom, a haloalkyl group such as trifluoromethyl and dichloromethyl, a nitro group, or an alkoxy group such as methoxy, ethoxy, propoxy, butoxy and pentoxy.

When the starting compounds are substituted as hereinbefore recited, it will be apparent to those skilled in the art that the final products formed by the process of the invention will bear, correspondingly, the same substituents. Such substituted compounds are the full equivalents of invention as particularly claimed.

If instead of phosgene a trialkyl orthoacylate is reacted with the 2-(2-aminophenylsulfonyl)-1-acetylhydrazide, the product formed has the 2-acetamido-3-alkyl-2H-1,2,4-benzothiadiazine 1,1-dioxide structure.

The best mode contemplated by the inventors of carrying out their invention will now be set forth as follows:

Example 1.—2 - acetamido - 6-chloro-7-methyl-2H-1,2,4-benzothiadiazin-3(4H)-one, 1,1-dioxide A. Preparation of starting material.—To an alcoholic solution of 8.8 g. (.12 m.) of acetylhydrazide, containing 12 g. of triethylamine, add 24.0 g. (.1 m.) of 2-amino-4-chloro-5-methyl-phenylsulfonyl chloride. Reflux the mixture for 1½ hours. Remove the alcohol at reduced pressure and wash the residue with water. Recrystallize the crude material with ethanol to give 2-(2-amino-4-chloro - 15 - methylbenzene-sulfonyl)-1-acetylhydrazide, M.P. 218–220° C.

B. *Preparation of final product.*—Suspend 3.4 g. (0.01225 m.) of the above starting material in 125 cc. of dimethoxyethane. Add a solution of 1.46 g. (.0147 m.) of phosgene in the same solvent. Reflux for 6 hours. Filter any insoluble material. Concentrate the filtrate and recrystallize the residue from acetone to give 2-acetamido-6 - chloro - 7 - methyl - 2H - 1,2,4-benzothiadiazin - 3(4H)-one 1,1-dioxide, M.P. 228–290° (d).

The above-prepared compound was pharmacologically evaluated, as will now be described: The compound was tested for hypotensive activity by intravenous administration to anesthetized cats. The blood pressure, heart rate and respiration were recorded. Blood pressure responses to the injection of epinephrine, acetylcholine and histamine were determined before and after administration of each dose of the test compound. Nictitating membrane responses to electrical stimulation were also recorded before and after administration of the compound which was injected intravenously in doses of 0.2, 2, and 20 mg./kg. approximately 30 minutes apart. The responses to the highest dose were observed for a minimum of 2 hours. The compound was considered active because it reduced blood pressure for 30 minutes.

The compound was tested as a diuretic with favorable results by the method of Lypschitz, et al., J. Pharmacol. 79:97, 1943.

The compound was tested for anti-tremorine (anti-Parkinsonian) activity with favorable results using the method of Everett et al., Science 124:79, 1956. The foregoing data indicates the effectiveness of the compound for the uses hereinbefore asserted.

The compositions constituting the invention can also be made according to the procedure hereinbefore set forth wherein substituents other than those hereinbefore enumerated are added to the benzothiadiazine nucleus. The toxicity of and the asserted actitivities of the composition so modified are not materially affected. Referring to Formula 6, Scheme B, above, such additions to the benzothiadiazine nucleus are illustrated as follows. The oxygen in the 3-position (X) 2H-1,2,4-benzothiadiazin-3(4H)ones can be converted to sulfur by heating with phosphorous pentasulfide. The 3-position (X) on the benzothiadiazines can be substituted also by a hydrogen atom and an alkyl, group as previously defined or a monocyclic aryl group such as phenyl, 2-thienyl, 3-thienyl, 2-, 3-, of 4-pyridyl, or an haloalkyl group as previously defined. Substituents in the 2-position (Scheme B, R) can be the acyl group of a carboxylic acid such as, for example but without limitation, actyl, propionyl, caproyl, benzoyl, toluyl or phenylacetyl, or a carboxamido group. Such additions to the molecular structure of the inventive concept herein described are fully equivalent to the subject matter particularly claimed.

The following example illustrates the preparation of another composition of the invention.

*Example 2.—2 - acetamido - 6 - chloro-2,7-dimethyl-2H-1,2,4-benzothiadiazin 1,1-dioxide*

Treat 2-(2-amino-4-chloro-5-methylphenylsulfonyl)-1-acetylhydrazide prepared as in Example I in ethanol with excess triethyl orthoacetate. Concentrate the reaction mixture at reduced pressure and treat the oily residue with benzene. Recrystallize the crude material from a mixture of ethanol and pet. ether, M.P. 228–230° C.

It will be apparent that the compositions of our invention may be made available in unit dosage forms with the dosage adjusted for the respective activity of the particular compound by admixing them with conventional excipients, and extenders.

Accordingly, the compounds of this invention can be administered with pharmaceutically acceptable inert carriers in a wide variety of oral or parenteral unit dosage forms containing 25, 100, 250 or 500 mg. of the active ingredients, or in admixture with other active compounds.

The subject matter which the applicants regard as their invention is particularly pointed out and distinctly claimed as follows:

1. 2 - acetamido - 6 - chloro - 3,7 - di(lower)alkyl-2H-1,2,4-benzothiadiazine 1,1-dioxide.
2. 2-acetamido - 6 - chloro - 2H - 1,2,4 - benzothiadiazin-3(4H)-one, 1,1-dioxide.
3. 2-acetamido - 6 - chloro - 3,7 - dimethyl - 2H -1,2,4-benzothiadiazine 1,1-dioxide.
4. 2-acetamido - 6 - chloro - 7 - methyl - 2H - 1,2,4-benzothiadiazin 3(4H)-one, 1,1-dioxide.
5. A compound of the formula

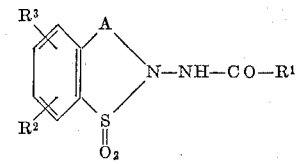

where A is selected from the group of

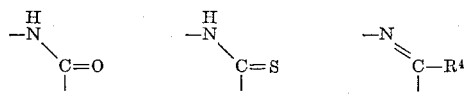

and $R^4$ is selected from the group of hydrogen and lower alkyl; $R^1$ is selected from the group consisting of an alkyl of less than six carbon atoms; and $R^2$ and $R^3$ are selected from the group consisting of hydrogen, chloro, lower alkyl, lower alkoxy, trifluoromethyl, dichloromethyl and nitro.

6. A process for preparing a compound of the formula

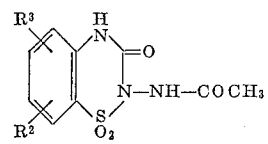

wherein $R^2$ is selected from the group consisting of hydrogen, chloro, lower alkyl, lower alkoxy, trifluoromethyl, dichloromethyl and nitro, and $R^3$ is selected from the group consisting of hydrogen, chloro, lower alkyl, lower alkoxy, trifluoromethyl, dichloromethyl and nitro, which comprises heating phosgene and a compound of the formula

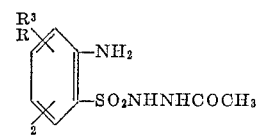

wherein $R^2$ and $R^3$ are as hereinbefore defined, in an inert organic solvent, at the reflux temperature of the mixture.

7. A process for preparing a compound of the formula

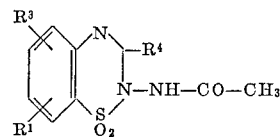

wherein $R^2$ is selected from the group consisting of hydrogen, chloro, lower alkyl, lower alkoxy, trifluoromethyl, dichloromethyl and nitro; $R^3$ is selected from the group consisting of hydrogen, cholor, lower alkyl, lower alkoxy, trifluoromethyl, dichloromethyl and nitro; and $R^4$ is selected from the group consisting of hydrogen and lower alkyl; which comprises heating a compound of the formula $$(R^5O_3C-R^4$$

where $R^4$ is as hereinbefore defined and $R^5$ is a lower alkyl group, with a compound of the formula

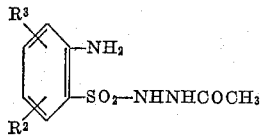

in a lower alkanol medium, at the reflux temperature of the mixture.

References Cited by the Examiner

UNITED STATES PATENTS 3,163,644  12/1964  De Stevens et al. ____ 260—243

OTHER REFERENCES

Hackh's Chemical Dictionary, p. 18 (1944).
Wertheim Textbook of Organic Chemistry, p. 763–764, (1945).

NICHOLAS S. RIZZO, *Primary Examiner.*